United States Patent Office
3,326,515
Patented June 20, 1967

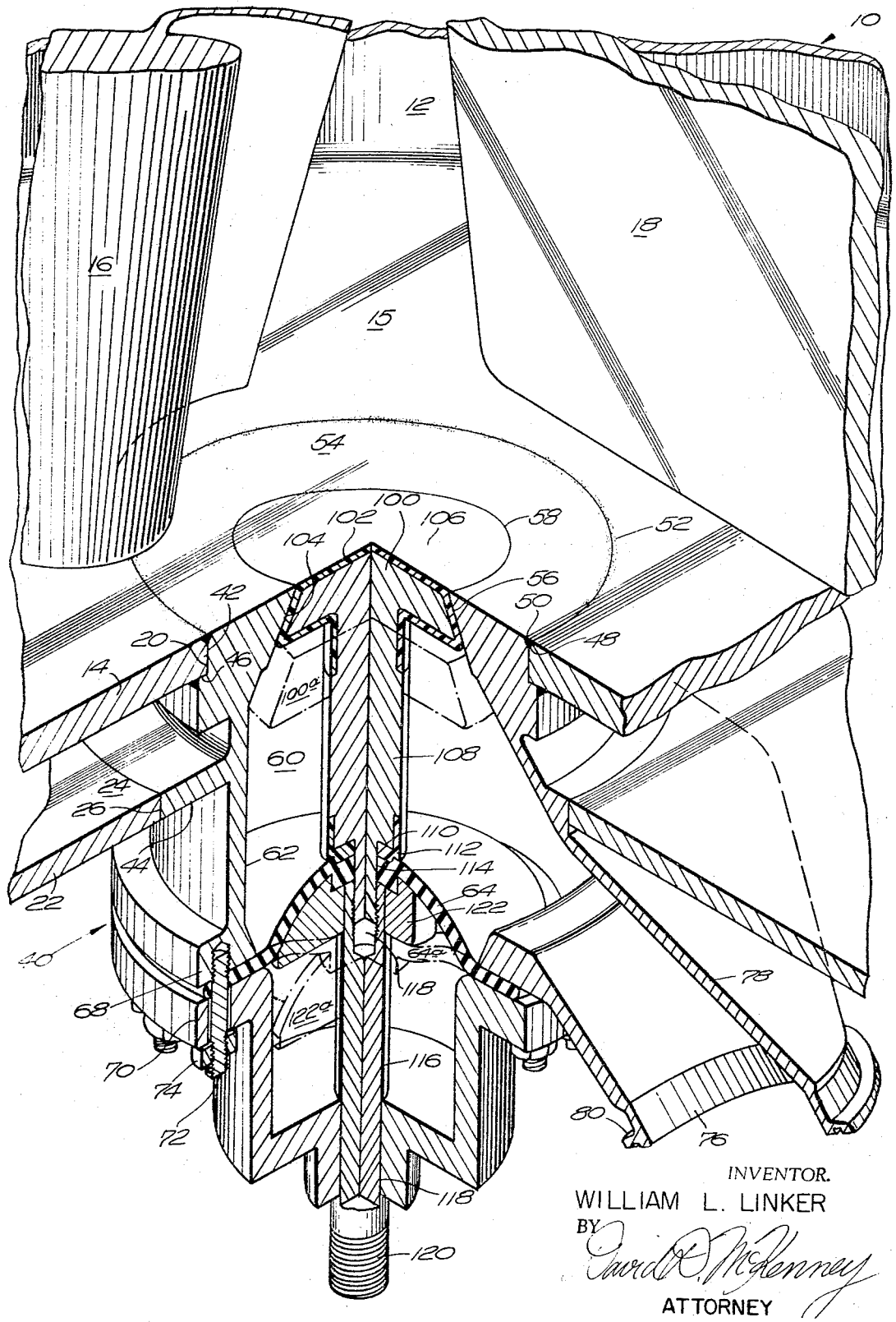

3,326,515
VALVE FOR USE WITH APPARATUS FOR MIXING SOLID ROCKET PROPELLANT
William L. Linker, Coventry, R.I., assignor to Grinnell Corporation, Providence, R.I., a corporation of Delaware
Filed Nov. 17, 1964, Ser. No. 411,754
4 Claims. (Cl. 251—144)

This invention relates generally to equipment designed to handle propellant mixtures of solid fuel for ballistic missiles and space boosters when the propellant is in its prepolymerised state. More specifically, it involves apparatus for controlling passage of the propellant from the mixing chamber when the constituents are blended, to the moulds where the fuel is polymerized and assumes its final form.

The casting of large solid propellant rockets from batch-mixed fuel requires a high degree of reproducibility from one batch to the next. This becomes obvious when it is considered that a 120 inch casing consumes 200,000 pounds of propellant and the batches are only approximately 5500 pounds each. Nonuniformity between the batches will cause variations of viscosity as well as oxidizer distribution in the final mix. These conditions seriously affect the uniform burning rate required for booster accuracy. To eliminate such nonuniformity great care must be exercised in the handling and preparation of all of the constituents of the mix. Whether or not this prior care will bear fruit ultimately depends upon the efficiency of the mixer used to blend the constituents. It has been found that an efficient mixer required blades which pass in very close proximity to the bottom of the mixing chamber. Furthermore, any pockets in the bottom surface tend to collect portions of the mix which are thenceforth no longer subjected to the blending action of the mixer blades. The result is inconsistency with resultant booster inaccuracy. In actual practice blade clearance is in the order of one quarter of an inch. Another requirement, due to the highly unstable nature of the mixture being handled, is that there be no metal to metal contact and no sliding engagement between surfaces. Either of these conditions create the possibility of a premature explosion. These three problems, pockets in the chamber surface, metal to metal contact and sliding between surfaces all exist potentially in the system used to empty the mixing chamber into the moulds. The existance of one or other of them was inevitable when standard valving is utilized.

The valve used to empty the mixing chamber must therefore be flush, in its closed position, with the bottom of the chamber to avoid pockets. Furthermore, its closure member must not move from its seat into the mixing chamber due to the close proximity of the blades to the bottom of the chamber. Since solid fuel is both highly abrasive and highly subject to ignition by either spark or friction, valves having metal to metal contact or sliding between elements which move relative to one another or stems with O-rings are unsafe in this service.

The various requirements of this type of service are met by the instant invention which comprises a valve having a disc with elastomerically coated conical sides which is received in a conical seat, set in the bottom of the mixing chamber. The top of the disc is flush with the bottom of the chamber thus avoiding any pockets. The disc is supported for movement into and out of the seat by a stem of substantially smaller diameter than the disc. The stem is in turn supported by any conventional normally closed actuating system. The actuating system is isolated from the stem and remainder of the valve by a diaphragm sealingly engaging the stem and a clamping flange spaced from and surrounding the stem.

It is therefore a primary object of the instant invention to provide a system for emptying solid fuel mixing chambers which will maintain a smooth substantially unbroken surface on the bottom of the chamber.

It is a further object of the instant invention to provide a system for emptying solid fuel mixing chambers which avoids metal to metal contact of system elements in contact with the solid fuel.

Still further it is an object of the instant invention to provide a system without sliding seals.

A further object of the instant invention is the provision of a valve which is flush with, and a continuation of the bottom of the solid fuel mixing chamber in which it is installed when that valve is in its closed position.

A further object of the instant invention is the provision of a valve which will provide a substantially unrestricted flow path when in its open position.

A further object of the instant invention is the provision of a valve for emptying solid fuel mixing chambers wherein the actuating system is isolated from the flow path by a flexible diaphragm.

A further object of the instant invention is the provision of a valve for emptying a solid fuel mixing chamber wherein the closure element does not enter the chamber upon opening.

A further object of the instant invention is the provision of a valve which when closed is flush with and a continuation of the bottom of the mixing chamber in which it is installed, has a conical seat intersecting the bottom of the mixing chamber, has a conical closure member truncated by a plane which when the member is in the closed position is a continuation of the bottom of the mixing chamber, has the sealing surface of the closure member elastomerically coated, has the closure member axially supported by a stem of substantially smaller diameter than the closure member and has a diaphragm isolating the actuating mechanism from the flow path of the valve.

Other objects will appear hereinafter.

The accompanying drawing shows and the specification describes a preferred embodiment of the present invention. However, it is merely illustrative of the invention which is not intended to be limited thereto.

The figure is a perspective view of a portion of a mixing chamber and a valve according to the present invention.

Referring now more particularly to the drawing the mixing chamber 10 has a generally vertical wall 12 surrounding generally horizontal bottom wall 14. Blades 16 and 18 operate in the chamber in close proximity the bottom surface 15 (generally with approximately one quarter inch clearance). A hole 20 is provided in the bottom. A second wall 22 spaced from the bottom and vertical wall may be provided, the space 24 thus created, constituting a steam jacket. Hole 26 is provided in wall 22, and is coaxial with hole 20.

A valve 40 is received by neck 42 and flange 44 in holes 20 and 26 respectively. Shoulder 46 is provided for axial positioning in the holes. Hole 20 is relieved at its upper edge to provide a circular notch 48 for the depositing of weld metal 50. The weld is ground off providing surface 52 which is flush with and a continuation of the surface 15. The valve is further provided with an upper surface 54 which intersects neck 42 and is flush with and a continuation of surface 52. Conical seating 56 intersects surface 54, defines port 58 and is undercut with respect to surface 54. Port 58 communicates between the mixing chamber and a second or valve chamber 60. The valve chamber is further defined by valve body 62 and flexible diaphragm 64. The diaphragm is retained between clamping ring 68 which is generally coaxial with seating 56, and bonnet by any conventional fastening means such as studs 72 and nuts 74. Chamber 60 is further provided with an outlet passage 76 defined by spout 78 having a coupling flange 80. Closure disc 100 is provided with an elastomeric coating 102 and a conical seat engaging surface 104 having substantially the same taper as the seating. The closure disc in the closed position is received by the seating thus closing port 58. Surface 106 truncates the conical sides 104 of the disc and, when the disc is closed, is flush with and a continuation of surface 54. It will thus be seen that with the valve installed in the mixing chamber and in the closed position, a smooth unbroken surface is provided on the bottom of the mixing chamber containing no pockets which will cause improper mixing. The closure disc is supported by an axially aligned stem 108 which is provided at its opposite end with a shoulder having an elastomeric coating 112 which is bonded to diaphragm 64. Extending axially from shoulder 110 is a thread stem 114 which passes through the diaphragm. Connecting rod 116 is provided having threaded hole 118 which receives threaded stem 114. This rod is coaxially received in the bonnet, projects through hole 118 in the bonnet and is provided with connection means such as threaded end 120 which may be secured to any conventional, normally closed actuator. Back up member 122 is mounted on the upper end of rod 116 and provides support for diaphragm 64. Dotted elements 100a, 64a and 122a indicate the closure disc, diaphragm and back up member as they would appear when the valve is partially open. It can be seen that due to the relatively thin disc and thin supporting stem there is little interference with propellant flow when the closure disc is in the open position.

I claim:

1. In an apparatus for mixing solid propellent rocket fuel wherein mixing blades are employed which are in close proximity to the bottom surface of the apparatus:
   (I) a vessel which: (A) has side walls, (B) has a bottom wall which: (1) has defined therein an aperture which (a) is substantially smaller than said bottom wall (b) extends through said bottom wall; (2) has a region which (a) surrounds said aperture (b) has a substantially continuous surface which (i) faces the interior of said vessel (ii) extends to the rim of said aperture (iii) is substantially larger than said aperture;
   (II) a valve which: (A) has a casing which: (1) has an inlet portion which (a) is fixedly received in said aperture (b) has an inlet portion face which (i) faces the interior of said vessel (ii) is flush with said continuous surface (iii) is a continuation of said continuous surface; (2) defines a hollow chamber; (3) has a seating which; (a) defines an opening in said inlet portion which (i) communicates with the interior of said vessel (ii) communicates with said hollow chamber, (b) intersects said inlet portion face (c) is undercut with respect to said inlet portion face; (4) has a clamping surface which (a) is spaced from said seating (b) defines an opening in said casing which (i) communicates exteriorly of said casing (ii) communicates with said hollow chamber; (5) an outlet passage which (a) is spaced from said seating (b) is spaced from said opening (c) communicates exteriorly of said casing (d) communicates with said hollow chamber; (B) a plug which: (1) has a body which (a) has a sealing portion which (i) has an elastomeric surface (ii) is tapered (iii) when said valve is in its closed position (iiia) is received by said seating (iiib) is in sealing relation with at least the portion of said seating adjacent said face (b) has a plug face which (i) intersects said tapered surface (ii) faces the interior of said vessel (iii) when said valve is in its closed position is (iiia) flush with said inlet portion face (iiib) a continuation of said inlet portion face, (c) has a rear face which (i) is spaced from said plug face substantially less than half the distance from said inlet portion face to said clamping surface (ii) faces the interior of said hollow chamber; (2) has a stem which (a) is substantially smaller in cross section than said plug body (b) is secured to said rear face of said plug body (c) extends (i) into said hollow chamber (ii) toward said clamping surface (d) has a shoulder on its free end (e) has a secondary stem which (i) extends axially from said shoulder (ii) has securing means on its free end; (C) has a bonnet which: (1) has a second clamping surface; (2) has a bearing means which (a) is spaced from said second clamping surface (b) is aligned with said stem; (3) has a connecting rod which (a) is supported in said bearing means for movement toward and away from said seating (b) has first connection means on one end for receiving said securing means (c) has second connecting means on the other end which (ia) extends exteriorly of said bonnet (ib) is for operation of said valve; (D) means for securing said bonnet to said casing: (E) has a diaphragm which: (1) is sealingly clamped about its rim between said first and said second clamping surfaces; (2) has a hole defined therein which (a) receives said secondary stem (b) is clamped about its periphery between said shoulder of said stem and said one end of said connection rod.

2. Apparatus according to claim 1 wherein said seating is conical in shape, said sealing portion of said plug is conical in shape, said seating and said sealing portion having the same taper.

3. Apparatus according to claim 2, wherein said seating, said sealing, said stem, said diaphragm, said connecting rod and said bearing means are axially aligned.

4. Apparatus according to claim 3 wherein the shoulder on the free end of said stem is elastomerically coated, said coating being adhesively secured to said diaphragm.

No references cited.

M. CARY NELSON, *Primary Examiner.*

WILLIAM CLINE, *Assistant Examiner.*